Aug. 6, 1929.  M. J. STAM  1,723,216
HOLLOW POLE
Filed Dec. 10, 1928
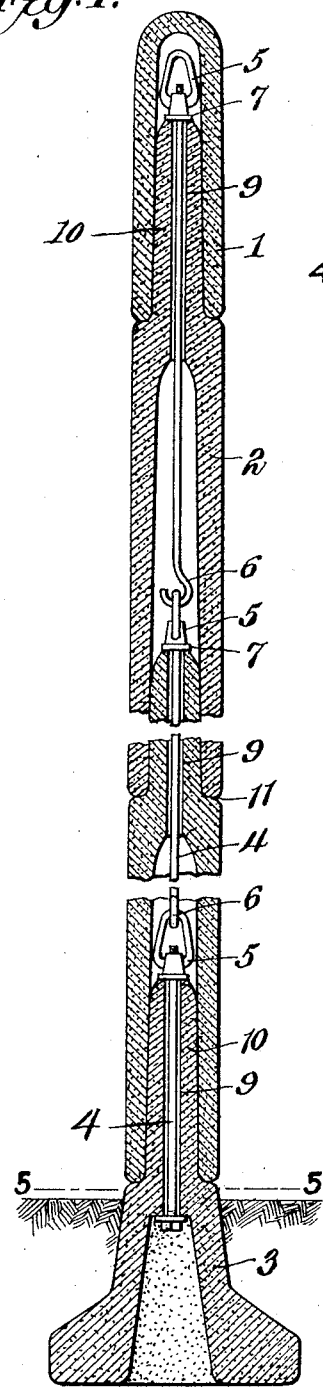
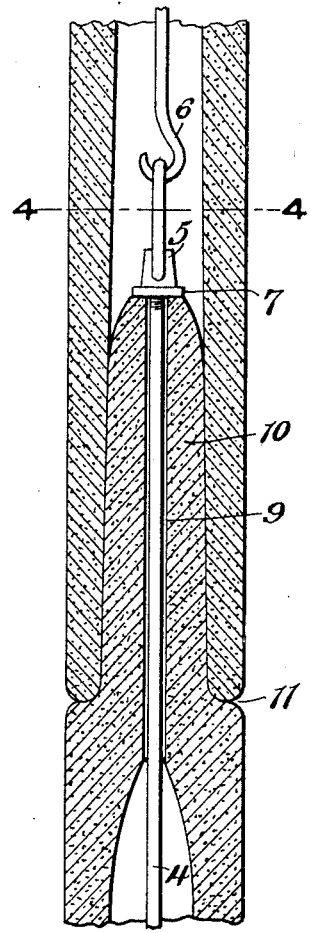
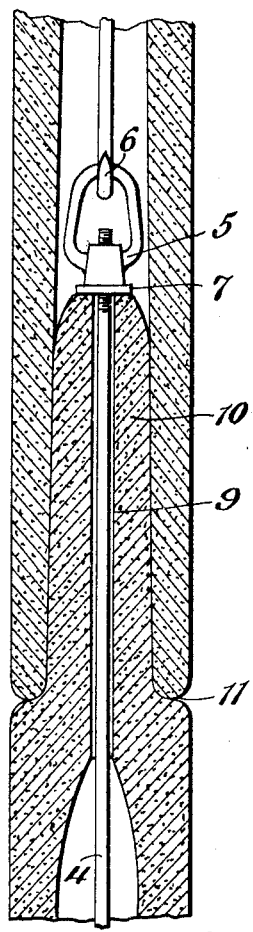
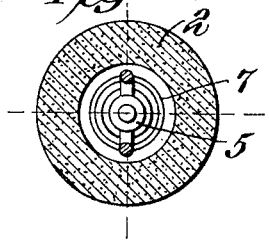
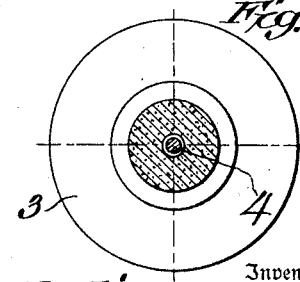
Inventor,
Martinus J. Stam,
Emil Bönnelycke
Attorney Patented Aug. 6, 1929.

1,723,216

UNITED STATES PATENT OFFICE.

MARTINUS JOÄNNES STAM, OF THE HAGUE, NETHERLANDS.

HOLLOW POLE.

Application filed December 10, 1928, Serial No. 324,993, and in the Netherlands May 14, 1927.

This invention relates to a hollow pole comprising a plurality of interfitting elements and adapted to carry telephone or telegraph wires, and conducting wires for tramway or railway systems. The pole may also be used for flag masts, antenna or signal posts, etc., and as a pipe conduit, a foundation-pillar for objects of art, a column for supporting structural parts, and a supporting post for army tents, military bridges, etc. It may be made of any suitable material, in particular, concrete or reinforced concrete.

The invention has for its object to provide a pole made up of hollow elements so constructed that water is prevented from entering the pole, and that the aforesaid elements themselves may be kept united under pressure. To this end, the said elements have their upper ends reduced so as to form a pin-like member which may have a tapered formation or may be provided with a shoulder, and which fits in and supports the open socket end of the next element. Each element contains a portion or member of a sectional anchor or tie-bolt, and by interconnecting the said sections and tightening them up, the elements are united so as to form the hollow pole.

An embodiment of the invention is illustrated in the accompanying drawing, whereof:

Figure 1 is a longitudinal vertical section of the improved pole;

Figs. 2 and 3 are enlarged fragmental vertical sectional views taken at right angles to each other; and Figs. 4 and 5 are transverse sections taken, respectively, on lines 4—4, Fig. 2, and 5—5, Fig. 1.

The aforesaid drawing shows a pole having a hollow top piece or cap 1, which may have any desired exterior shape. This top element, just as the other elements, encloses the upper end 10 of the next lower element 2, which end is reduced and made so as to form a pin-like part or member. In the embodiment illustrated, the base piece 3 is adapted to support the whole pole and it is provided with a recess for the insertion of an anchoring or tie bolt 4, passing through an axial bore 9 in the upper or pin part 10 of the base-piece. The pins 10 of all of the elements are provided with such bores 9 for the passage of anchoring or tie bolts 4 which are interconnected by means of hooks 6 and loop nuts 5 and adapted to be tightened up by means of the latter and the washers 7. The said anchoring bolts 4 form the sections of a sectional anchor uniting the various elements 1, 2 and 3. The hollow lower or socket parts of the elements surrounding the pins 10 of preceding elements rest on shoulders 11, which are formed at the place where the pin part merges into the enlarged hollow or socket part of an element.

The shape of the base piece 3 may be varied, and the base piece itself may be made larger or smaller in accordance with the particular nature of the subsoil.

If the poles are to be used as foundation pillars they are provided with a pointed bottom element not shown. The pointed end may be provided with a bore for the passage of an anchoring section therethrough.

Foundation pillars of this type have the advantage that in ramming frames, particularly when using steam rams, the frames may now be made very light and short. As soon as a pillar element has been rammed in, another element can be superposed upon it. The ramming-in may be effected by means of a pole cap placed on the shoulder 11 of a pole element.

By placing a tightening ring of suitable material on the shoulder 11 of a pole element, an absolutely watertight joint may be obtained. The hollow space in the lowermost element or in the base piece may then be filled up wholly or partially with a waterproof substance, such as tar or asphalt, after the insertion of the first anchoring section. When the next element has been placed in position on the shoulder of the preceding one, the anchoring section of the former is hooked in the loop nut or eye 5 at the upper end of the anchor section of the latter element. Further, the individual elements may have an increasing diameter or may taper in such a manner that the pole grows thinner gradually or may have a staggered formation from element to element.

I claim:

A pole, comprising a succession of interfitting elements each having a lower socket portion and an upper portion of reduced diameter forming an elongated pin which fits entirely within the socket of the next higher element, and also having an external circumscribing shoulder at the junction of said portions and whereon the lower end of the socket portion of the said next higher element rests; and a sectional anchor for connecting the successive pole elements together under pressure, each section of the anchor being arranged within an element of the pole.

In testimony whereof I affix my signature.

MARTINUS JOÄNNES STAM.